Patented May 17, 1949

2,470,447

UNITED STATES PATENT OFFICE 2,470,447

STABILIZATION OF LOW UNSATURATION ISOOLEFINIC POLYMERS

Carll F. Van Gilder, Roselle, N. J., assignor to Standard Oil Development Company, a corporation of Delaware No Drawing. Application July 11, 1945, Serial No. 604,519

6 Claims. (Cl. 260—94)

This invention relates to the stabilization of polymerized isobutylene and low unsaturation polymers generally, relates to means for maintaining the molecular weight of low unsaturation polymers and of polymers containing isobutylene, and relates especially to a polymerization process in which the polymer stabilizer is added to the polymerizate feed and taken up during the polymerization reaction.

It has been found possible to produce a wide range of isobutylene-containing polymers and low unsaturation polymers by a low temperature technique in which the olefinic material is cooled to a temperature below 0° C. and polymerized by the application to the cold material of a Friedel-Crafts type catalyst to yield polymers which may have Staudinger molecular weight numbers ranging from 1000 up to 500,000 or more. However, these polymers show a tendency towards instability, especially during heating, storage and mechanical working. It has been found that poly alkylated phenols such as 2,6-tertiary butyl, 4 methyl phenol show a potent stabilizing action upon the polymers and are very effective in preventing breakdown of the polymers to lower molecular weight materials. But difficulty is encountered in incorporating these protective agents into the polymers, since the mechanical working necessary to disperse the protective agent into the polymer is very harmful to the molecular weight of the polymer and the harm is done before the protective agent can be put into the polymer in sufficiently well dispersed homogeneous condition to be effective.

The polymerization reaction for the production of polymers containing isobutylene is an extremely sensitive one which is easily poisoned and interfered with by the presence of even traces of impurities; $\frac{1}{10}$ of a percent to 1% of normal butene will seriously reduce the molecular weight of the polymer produced. In the making of copolymers of isobutylene with such substances as butadiene, isoprene, and the like, the presence of the copolymerizable compound very greatly reduces the obtainable molecular weight. That is, with a high purity of isobutylene, a low temperature and a potent catalyst sufficiently good to produce simple polyisobutylene with a molecular weight of from 400,000 to 500,000, the presence of 5% of isoprene reduces the molecular weight of the resulting polymer to from 30,000 to 70,000.

The presence of traces of the alcohols similarly profoundly poisons the reaction, and the presence of more than very small traces may result in the production of no more than the dimer and trimer of isobutylene. Accordingly, in the polymerization reaction, it has been regarded as imperative that the utmost possible purity of feed materials be had.

Numerous substances are known which are reasonably effective anti-oxidation agents and stabilizers for natural rubber, the various bunas, and the like, but these compounds are found to be very severe poisons to the polymerization reaction. This is particularly true of the simple phenols which have been extensively used, and to the amines, both simple and substituted; these two classes making up substantially all of the known anti-oxidants for natural rubber.

According to the present invention, it is now found that the polyalkylated phenols, in spite of the presence of the hydroxy group, show almost no poisoning effect upon the reaction, and they may be admixed with the isobutylenic feed, and carried through the polymerization reaction unchanged and without influence on the polymerization reaction; into a condition of very excellent, uniform, dispersion in the finished polymer, whereby the protective action is obtained from the very moment of formation of the polymer and no question of molecular weight breakdown during the introduction of the protective substance occurs.

Accordingly, the invention polymerizes isobutylene in the presence of a polyalkylated phenol to produce directly an isobutylenic polymer fully protected against molecular weight breakdown during storage, heating or mechanical working. Other objects and details of the invention will be apparent from the following description:

In practicing the invention, an olefinic material is cooled to a low temperature, usually between 0° C. and —169° C., the preferred temperature range being from —40° C. to —110° C. The olefinic or isobutylenic material may be cooled by a refrigerating jacket upon the container or reactor, or by the direct admixture with the isobutylenic material of a suitable refrigerant. For the refrigerating jacket, any low-boiling liquid, boiling under either atmospheric pressure, vacuum or elevated pressure at the desired temperature may be used. For direct admixture, such refrigerants as liquid propane yielding a temperature of −40° C. or liquid or solid carbon dioxide yielding a temperature of −78° C. or liquid ethane yielding a temperature of −88° C. or liquid ethylene yielding a temperature of −103° C. are particularly suitable. The olefinic material may contain, in addition, a convenient diluent; such materials as the lower halogen-substituted linear-chain compounds being particularly suitable.

These diluents are particularly desirable when the reaction material is cooled by a refrigerating jacket, since the presence of the diluents reduces the amount of gel formation and improves the characteristics of the polymer. However, they may also be used in combination with an internal refrigerant, especially when the amount of internal refrigerant is relatively small, or when the heat of reaction volatilizes out most of the internal refrigerant.

For other diluent materials, ethyl and methyl chloride, ethylene dichloride, chloroform, and the like, are particularly suitable. Also, carbon disulfide is highly suitable. In addition, such hydrocarbon diluents as liquid ethane, liquid propane, liquid butane, liquid pentane, and the like are suitable, depending upon the polymerization temperature, since these substances may serve either as refrigerants or refrigerant diluents, or simply as diluents, depending upon the boiling point of the material and the polymerization temperature.

The polymerization mixture may consist simply of isobutylene or it may consist of isobutylene with a refrigerant or refrigerant diluent, as above pointed out. Alternatively, the polymerization mixture may contain a copolymerizable compound for which the multiolefins are particularly suitable; such substances as butadiene, isoprene, piperylene, dimethyl butadiene, myrcene and dimethallyl are particularly suitable.

The copolymerization mixture may also be a triple or quadruple component mixture, in which case such additional substances as styrene or alpha methyl styrene, para methyl styrene, alpha ethyl styrene, para ethyl styrene or the halogen-substituted styrenes, or the multialkyl substituted styrenes are particularly suitable. In any of these mixtures, the significant amount of any one component is as low as from ½% to 1%. That is, amounts of multiolefin as small as ½% produce significant and valuable differences in properties in the copolymer. Amounts of styrene or substituted styrenes as small as 1% produce significant differences; as do amounts of isobutylene as small as 1%. It may be noted that all of these compounds are substituted ethylenes. Isobutylene may be regarded as dimethyl ethylene; styrene may be regarded as phenyl ethylene; alpha methyl styrene as methyl phenyl ethylene; butadiene as diethylene; isoprene may be regarded as methyl diethylene, and so on.

The multiolefinic copolymerizable compound may be any compound having from 4 to 10 carbon atoms per molecule with 2 or more double linkages, the number of double linkages being immaterial. If the copolymerizable compound is regarded as a substituted butadiene, the size, location and number of the substituents are of relatively minor consequence, although some compounds polymerize more easily than others, and some compounds require for copolymerization more potent catalysts than others. It is not even necessary that the substituents be hydrocarbons, since various halogenated and oxygenated multiolefins copolymerize quite well.

For the polymerization catalyst, any of the Friedel-Crafts catalysts shown by N. O. Calloway in his article on "The Friedel-Crafts Synthesis," printed in the issue of "Chemical Reviews," published for the American Chemical Society at Baltimore, in 1935, in vol. XVII, No. 3, the article beginning on page 327, the list being particularly well shown on page 375, may be used. With mixtures containing isobutylene as the only polymerizable substance, gaseous boron trifluoride is particularly useful and very convenient; and gaseous boron trifluoride is usable for the production of copolymers with some of the multiolefins, although its catalytic powers are relatively very easily poisoned and are poisoned by some of the multiolefinic substances themselves, particularly butadiene. For the production of the copolymerizates, the liquid catalysts are preferred. Liquid titanium tetra chloride is directly usable. The solid Friedel-Crafts catalysts must however be dissolved in a low-freezing, non-complex-forming solvent. Aluminum chloride in such a solution is particularly advantageous. Aluminum bromo chloride is soluble in a wider range of solvents, but is not as rapid a catalyst. Aluminum eth-oxy-chloride also is soluble in a wider range of solvents, but is not as rapid a catalyst as simple aluminum chloride. Other Friedel-Crafts catalyst show similar variations.

For the catalyst solvent, the requirements are that it have a freezing point below 0° C., thereby being "low-freezing" and that it boil away from the dissolved catalyst substance with a rise in temperature of no more than 1 or 2 degrees, thereby being "non-complex-forming." Particularly useful solvents are the above-mentioned halogen substituted lower organic compounds; any of the mono- or polyhalogen substituted compounds which have freezing points below 0° C. are usable. It may be noted that it is not necessary that the freezing point of the catalyst solvent be below the polymerization temperature; it is merely necessary that the catalyst solvent be liquid at a temperature maintainable within the polymerization reactor in order to obtain a rapid dispersion of the catalyst into the polymerization mixture. If the catalyst solvent is liquid at the polymerization temperature, the catalyst solvent and the Friedel-Crafts catalyst are quickly taken up and dispersed into the reaction liquid under advantageous polymerization conditions and dispersion. It does not appear that the mere fact that the catalyst solvent may freeze before it is dissolved is significant.

The catalyst, if gaseous, is conveniently bubbled through the polymerization mixture. If liquid, the catalyst is conveniently applied to the polymerized mixture in the form of a finely divided spray onto the surface of the rapidly stirred, cold, olefinic material or in the form of a fine, high pressure jet into the body of rapidly stirred polymerization liquid.

The reaction proceeds promptly to yield the desired polymer. In the case of isobutylene alone, the polymer obtained may be more or less heavy, viscous oil with a Staudinger number (that is, a molecular weight according to the Staudinger method); ranging from about 1000 up to 15,000 or 18,000; or it may be a heavy, plastic sticky semi-solid with a Staudinger number between 15,000 or 18,000 to about 27,000, or it may be an elastic solid with more or less cold flow and Staudinger molecular weight values from 27,000 to 500,000 or even higher. The simple polymer of isobutylene partakes more of the character of a fully saturated aliphatic compound than it does of an olefinic compound and the iodine number is extremely low, and in the higher molecular weight polymers is so low as to be unmeasurable.

Copolymers of isobutylene and a multiolefin are rarely produced with molecular weights below about 20,000 since at lower molecular weights, the characteristic reactivity with sulfur to develop an elastic limit and a substantial tensile strength does not occur; apparently because of the necessity in each molecule of the polymer of a substantial number of residual double linkages from interpolymerized multiolefin sufficient to yield several cross linkages between adjacent molecules by the curing reaction. The preferred molecular weight of the copolymer of isobutylene and a multiolefin lies within the range between about 35,000 to about 80,000, since lower molecular weights cure poorly and higher molecular weights process poorly, the polymer being too tough and leathery to be milled, extruded, calendered and otherwise processed.

In the making of such copolymerizates, the isobutylene preferably is present in major proportion and the multiolefin present in minor proportions; the preferred ratio being from 70 parts of isobutylene with 30 parts of a multiolefin down to 99.5 parts of isobutylene with 0.5 part of the multiolefin, depending upon the ratio of copolymerization and the desired amount of unsaturation in the polymer. The resulting copolymers may have iodine numbers ranging from about 0.5 to about 50, the preferred range being from about 1 to about 20. Such copolymers show a unique reactivity with sulfur in a curing reaction to yield a definite elastic limit, a tensile strength at break, ranging from 1500 to 4000 pounds per square inch and an elongation at break ranging from 500% to 1200%, these materials being highly satisfactory substitutes for caoutchouc (natural rubber).

In practicing the invention, the desired olefinic mixture is prepared and to it there is added from 0.1% to 5% of the desired polyalkylated phenol and the polymerization is conducted, as above outlined, in the presence of the polyalkylated phenol.

For further details of the polymerization process and details of the various available protective agents, cross reference is herewith made to U. S. Patents No. 2,356,127 and No. 2,356,128 and to the applications of Smith and Wilson, Serial No. 604,520, filed contemporaneously herewith, now abandoned, and the application of Joseph F. Nelson, Serial No. 611,909, filed Aug. 21, 1945. These two applications show in full detail the full polymerization procedure, but without the protective agent in the polymerization mixture, and also show the range of materials which have protective effects, all of which may be added to the polymerization mixture, according to the present invention, before polymerization.

A particularly valuable protective agent is the 2,6-tertiary butyl, 4-methyl, phenol prepared by the interaction of para cresol and isobutylene in the presence of concentrated sulfuric acid, as shown in more detail in U. S. Patent No. 1,954,985, issued April 13, 1934, to Hyym E. Buc.

It may be noted that these compounds all belong to the general class of "hindered phenols" in which the characteristics of the phenolic group are altered, modified, and interfered with by the presence of adjacent alkyl substituents. The presence of these auxiliary substituents, by their influence on the phenolic group prevents reaction between the phenol and the Friedel-Crafts catalyst, and this factor permits them to be present in the reaction mixture during the polymerization procedure. It is to the present unknown why the "hindered phenols" should all be more or less effective as protective agents in the polymer and it is not known whether the new and unexpected combination of properties in the "hindered phenols" of freedom from effect on the Friedel-Crafts catalysts combined with the observed strong protective actions on the polymer is a purely fortuitous thing, or whether the two effects result from the same structural items in the "hindered polymers."

Particularly suitable for this reaction are such substances as 2,4-di-t.-amyl phenol, 2-methyl-4-t.-butyl phenol, 2,3-dimethyl-6-t.-butyl phenol, 4-methyl-2-t.-butyl phenol, 4-methyl-2-n-butyl phenol, 2,4,6-trimethyl phenol, 2,4,6-tri-t.-butyl phenol, 4-methyl-2,6-di-t.-butyl phenol and 2,4-dimethyl-6-t.-butyl phenol.

The polymerization is then conducted upon the isobutylenic material in the presence of a protective agent. The polymerization occurs promptly without alteration from the presence of the protective agent, and the protective agent is absorbed or occluded or otherwise taken up in the solid polymer. When the desired stage of polymerization is reached, the polymer is separated from the mixture in any convenient manner such as by discharging the polymerization mixture into warm water with or without other quenching and modifying agents. The solid polymer is then separated preferably by filtration from the water slurry, dried and milled to bring it into coherent condition ready for compounding and use.

EXAMPLE 1

A mixture was prepared consisting of isobutylene, having a purity of approximately 98% and approximately 0.5% (on the liquid isobutylene) of 2,6 tertiary butyl 4, methyl phenol, and cooled to a temperature of −88° C. by liquid ethane. The alkylated phenol dissolved promptly in the liquid isobutylene. The material was then polymerized by bubbling a stream of gaseous boron trifluoride through the cold material. The polymerization proceeded rapidly to yield a solid polymer of isobutylene in which the alkylated phenol was absorbed. The solid polymer was recovered from the polymerization reactor by dumping the partially polymerized mixture into warm water to drive off the unpolymerized residues. The polymer was found upon test to have a molecular weight of approximately 100,000.

A similar sample of polyisobutylene prepared by the same procedure, but in the absence of the alkylated phenol was also obtained and comparison tests were made upon the two samples by milling them upon the open roll mill at a temperature of approximately 237° F. to yield the results shown in Table I.

Table I

| Milling Time | Unprotected Polymer | Protected Polymer |
| --- | --- | --- |
| 0 | 100,000 | 100,000 |
| 5 minutes | 90,000 | 99,500 |
| 10 minutes | 80,000 | 99,300 |
| 10 minutes | 70,000 | 99,200 |
| 15 minutes | 60,000 | 99,100 |
| 30 minutes | 35,000 | 99,000 |
| 45 minutes | 20,000 | 99,100 |
| 60 minutes | 12,000 | 99,090 |

These comparative results show the excellent protective effect of the alkylated phenol of the invention upon the molecular weight of simple polyisobutylene.

EXAMPLE 2

A mixture was prepared consisting of 97.5 parts of isobutylene of 99% purity and 2.5 parts of isoprene of 96% purity. This mixture was diluted with 200 parts (by volume) of liquid ethane yielding a temperature of approximately −100° C. This mixture was divided into two parts, and to one part was added approximately 0.1% of 2,6-tertiary butyl,4-methyl phenol. The two mixtures were separately polymerized by the addition to each thereof of approximately 50 parts by volume of a solution of aluminum chloride in methyl chloride containing approximately 0.8% of aluminum chloride. This amount of catalyst was sufficient to polymerize approximately 35% of the olefinic material present in each mixture. The solid polymer was then recovered by dumping the partially polymerized material into warm water to volatilize out the unpolymerized material and refrigerant, and the solid polymer was then strained out of the water solution, the respective portions being separately treated throughout.

The two portions of polymer were found to have respective molecular weights very close to 70,000.

Portions of the respective polymers were then placed upon the roll mill and milled to determine the rate of breakdown. It was observed that a substantial number of hours of milling on the open roll mill made comparatively little change in the characteristics and properties of the protected polymer; whereas the same amount of milling made noticeable and substantial changes in the properties of the unprotected polymer, a substantial and troublesome breakdown in molecular weight being most noticeable.

EXAMPLE 3

A series of polymerizations were made including in each one of the following lists of protective agents:

2,4-di-t.-amyl phenol
2-methyl-4-t.-butyl phenol
2,3-dimethyl-6-t.-butyl phenol
4-methyl-2-t.-butyl phenol
4-methyl-2-n-butyl phenol
2,4,6-trimethyl phenol
2,4,6-tri-t.-butyl phenol
4-methyl-2,6-di-t.-butyl phenol
2,4-dimethyl-6-t.-butyl phenol one polymerization being conducted without the addition of any protective agent.

These several polymers were then placed in an accelerated aging test in the form of a hot air oven at 110° C., through which a slow current of hot air passed, and molecular weight determinations were made at two-day intervals. These determinations showed an excellent resistance to molecular weight breakdown and the results were indistinguishable from those obtained by J. F. Nelson in the above mentioned application. These results show that as far as the protective effects were concerned, it made relatively little difference whether the protective agent was added to the polymerization mixture, or milled in after purifying of the polymer, except for the unavoidable molecular weight breakdown incurred during the milling required for the washing and precessing.

EXAMPLE 4

Similar results were obtained on a tri-polymer made up of 57 parts of styrene, 40 parts of isobutylene and 3 parts of isoprene. This mixture was prepared and approximately 0.5% of the above listed protective agents were added to various portions of the copolymerizate mixture which was then polymerized at −103° C. in the presence of liquid ethylene as a diluent refrigerant to approximately 100% polymerization. The polymers were recovered separately and tested in the hot air oven, as above described. The several protective agents showed protective effects of the same order of magnitude and approximately the same order of efficiency as on the copolymer of isobutylene and isoprene.

Thus the process of the invention polymerizes an olefinic material in the presence of a protective agent in the form of a "hindered phenol," or a polyalkylated phenol; preferably a 2,4,6 alkylated phenol to yield a polymerizate containing a protective agent which preserves the molecular weight from breakdown by mechanical working, heating or prolonged storage.

The invention claimed is:

1. The polymerization process consisting of the steps in combination of mixing an isoolefin and 0.1–5% of a poly alkylated phenol and polymerizing the mixture at a temperature within the range between 0° C. and −164° C. by the application to the cold mixture of a Friedel-Crafts catalyst dissolved in a non-complex forming solvent which is liquid at the reaction temperature.

2. The polymerization process consisting of the steps in combination of mixing isobutylene and 0.1–5% of a poly alkylated phenol and polymerizing the mixture at a temperature within the range between 0° C. and −164° C. by the application to the cold mixture of a Friedel-Crafts catalyst dissolved in a non-complex forming solvent which is liquid at the reaction temperature.

3. The polymerization process consisting of the steps in combination of mixing isobutylene and 0.1–5% of a 2,4,6-trialkylated phenol and polymerizing the mixture at a temperature within the range between 0° C. and −164° C. by the application to the cold mixture of a Friedel-Crafts catalyst dissolved in a non-complex forming solvent which is liquid at the reaction temperature.

4. The polymerization process consisting of the steps in combination of mixing isobutylene and 0.1–5% of 2,4,6-tritertiary butyl phenol and polymerizing the mixture at a temperature within the range between 0° C. and −164° C. by the application to the cold mixture of a Friedel-Crafts catalyst dissolved in a non-complex forming solvent which is liquid at the reaction temperature.

5. The polymerization process consisting of the steps in combination of mixing isobutylene and 0.1–5% of 2,4,6-trimethyl phenol and polymerizing the mixture at a temperature within the range between 0° C. and −164° C. by the application to the cold mixture of a Friedel-Crafts catalyst dissolved in a non-complex forming solvent which is liquid at the reaction temperature.

6. The polymerization process consisting of the steps in combination of mixing isobutylene and 0.1–5% of 2,6-ditertiary butyl, 4-methyl phenol and polymerizing the mixture at a temperature within the range between 0° C. and −164° C. by the application to the cold mixture of a Friedel- Craf's catalyst dissolved in a non-complex forming solvent which is liquid at the reaction temperature.

CARLL F. VAN GILDER.

REFERENCES CITED

The following references are of record in the file of this patent:

UNITED STATES PATENTS

| Number | Name | Date |
|---|---|---|
| 1,948,582 | Hunt | Feb. 27, 1934 |
| 2,031,930 | Buc | Feb. 25, 1936 |
| 2,160,172 | Rosen | May 30, 1939 |
| 2,181,102 | Stoesser | Nov. 21, 1939 |
| 2,359,360 | Gibbs | Oct. 3, 1944 |